United States Patent [19]

Khan

[11] Patent Number: 4,899,641

[45] Date of Patent: Feb. 13, 1990

[54] ELECTRO-HYDRAULIC HELICOPTER SYSTEM HAVING INDIVIDUAL BLADE CONTROL

[75] Inventor: Zafer N. Khan, Windsor, Conn.

[73] Assignee: Kaman Aerospace Corporation, Bloomfield, Conn.

[21] Appl. No.: 194,400

[22] Filed: May 16, 1988

[51] Int. Cl.⁴ .................. F15B 13/044; F63H 3/08
[52] U.S. Cl. ................................ 91/459; 416/114; 416/158; 416/162
[58] Field of Search ............... 137/580; 416/114, 162, 416/158; 91/361, 459

[56] References Cited

U.S. PATENT DOCUMENTS

| | | | |
|---|---|---|---|
| 3,242,992 | 3/1966 | Quenneville et al. | 416/162 X |
| 3,664,762 | 5/1972 | Lachnit | 415/148 X |
| 4,445,421 | 5/1984 | Walker et al. | 91/361 X |
| 4,749,335 | 6/1988 | Brandt et al. | 137/580 X |

FOREIGN PATENT DOCUMENTS

| | | | |
|---|---|---|---|
| 1204772 | 1/1960 | France | 137/580 |
| 2437512 | 5/1980 | France | 137/580 |

Primary Examiner—Edward K. Look
Attorney, Agent, or Firm—McCormick, Paulding & Huber

[57] ABSTRACT

A novel electro-hydraulic control system for use with a helicopter includes a plurality of electro-hydraulic modules which provide control signals to corresponding blade actuators. A controller receives helicopter parameter input signals as well as pilot command signals and generates the control signals in accordance with preestablished algorithms. The system is characterized by a hydraulic slip ring that transmits the hydraulic control signals from the fuselage to the rotating assembly. Consequently, the present system provides "fly by wire" operation with individually addressable helicopter blades.

13 Claims, 5 Drawing Sheets

FIG. 6 ns of the prior art, the mechanical
ELECTRO-HYDRAULIC HELICOPTER SYSTEM HAVING INDIVIDUAL BLADE CONTROL

TECHNICAL FIELD

This invention relates to electro-hydraulic helicopter control systems and more particularly to a full authority electro-hydraulic control system having a hydraulic slip ring providing individual blade control.

BACKGROUND OF THE INVENTION

It is well known that helicopter flight is primarily controlled by cyclic and collective control inputs to the rotating helicopter blades, usually through a common mechanical input such as a swash plate. Input and transfer of these control signals to the rotating blades is most often accomplished by an exclusively mechanical arrangement of levers, mixers and cranks. Some known control systems modify the mechanical arrangements by the addition of a hydraulic boost mechanism to provide amplification of the mechanical input signals. Other control systems are mechanical with auxiliary hydraulic amplification, but lack a direct mechanical connection between the control stick that inputs the signals to control the helicopter blades.

These known control systems all must provide the same blade control signals to every blade because of the common control signal input mechanism. Individual blade control, wherein each blade may receive different control signals, is therefore physically impossible.

A major problem which still plagues present day helicopters is the very high vibration magnitudes. The major sources of these vibrations are rotor induced shears and moments. Consequently, known control systems incorporate mechanical devices such as vibration absorbers and isolators to provide compensation. Unfortunately, these mechanical devices do not effect the magnitude of the shears and moments.

The nature of the vibration inducing shears and moments is such as to produce an input at the hub at a frequency which is an integral multiple of the number of blades in the rotor system. Therefore, the predominant frequency of excitation is the "nth" harmonic of an n bladed rotor. For a four bladed rotor the predominant frequency of the vibration is the fourth harmonic or four per rev.

Other helicopter control systems have attempted to minimize vibration by reducing the magnitude of these shears and moments by the introduction of blade pitch changes at non-predominant harmonic frequencies. The airloads on each blade are therefore altered by the control system generating blade loads at other than the predominant harmonic frequency. For a four bladed helicopter rotor, these systems introduce three per rev and five per rev pitch changes on the blades in the rotating system. Introduction of these harmonic forces has been accomplished by superimposing a predominant harmonic (four per rev for four bladed helicopters) translation and rotation on the nonrotating control mechanism or swash plate at the helicopter blade hub. These higher harmonic input forces are introduced downstream of azimuth or the swash plate in the stationary part of the control system. Individual blade control, not physically possible with known helicopter control systems, provides tremendous versatility because other control harmonic forces (such as two per rev forces) which can also effect rotor performance, can be easily introduced on a per blade basis. With mechanical systems of the prior art, the mechanical control elements have inherent built-in drawbacks, such as backlash and bearings hystresis, due to the friction and structural compliance found in these elaborate mechanical systems, even when augmented by servohydraulics. With known mechanical systems the higher harmonic forces input to reduce vibration problems are all of small magnitude and operate at relatively high frequency. However, the benefits of the compensating harmonic forces are seriously diminished because the mechanical control system lacks sufficient resolution, and is most often saturated.

It would be advantageous for a helicopter control system to be fully hydraulic allowing for individual blade control and allowing for auxiliary blade tracking higher harmonic and trim force control inputs using exclusively electrical or optical input signals and hydraulic controls. The present invention is directed toward such a system.

SUMMARY OF THE INVENTION

An object of the present invention is to provide for a helicopter control system which allows for individual blade control.

Another object of the present invention is to provide a helicopter control system which is fully hydraulic.

According to the present invention an apparatus used in providing fluid control signals of a first element to a moveable second element include a first member having an outer surface formed with a plurality of grooves, each receiving respective fluid control signals by means of corresponding channels formed in said first member interior. The apparatus also includes a second member adapted to receive, at an inner surface thereof, the first member outer surface. The second member inner surface has a plurality of grooves each communicating with corresponding second member interior channels and each in registration with a corresponding first member groove. A second member is moveable relative to the first member, with the registered first and second member grooves continuously communicating the fluid control signals throughout the displacement.

According to another aspect of the present invention, a hydraulic actuator assembly for providing hydraulic control signals between first and second elements includes a hydraulic valving means communicating with a source of fluid pressure and a fluid pressure return through respective ports in the valving means. The valving means selectively provides fluid control signals. An interface apparatus is included for communicating the control signals from the first element to the second element. The apparatus includes a first member having an outer surface formed with a plurality of grooves each for receiving from respective interior channels fluid control signals, and the second member adapted to receive at an inner surface thereof the first member outer surface. The second member inner surface having a plurality of grooves communicating with second member interior channels and each in registration with a corresponding first member groove. The second member is moveable relative to the first member. The registered first and second member grooves continuously communicate the fluid control signals throughout any second member movement. Also included is an actuator means configured with the moving second element for receiving the control signals from the interface means and generating displacements in dependence thereon.

DESCRIPTION OF THE PREFERRED EMBODIMENT

Figure 1:
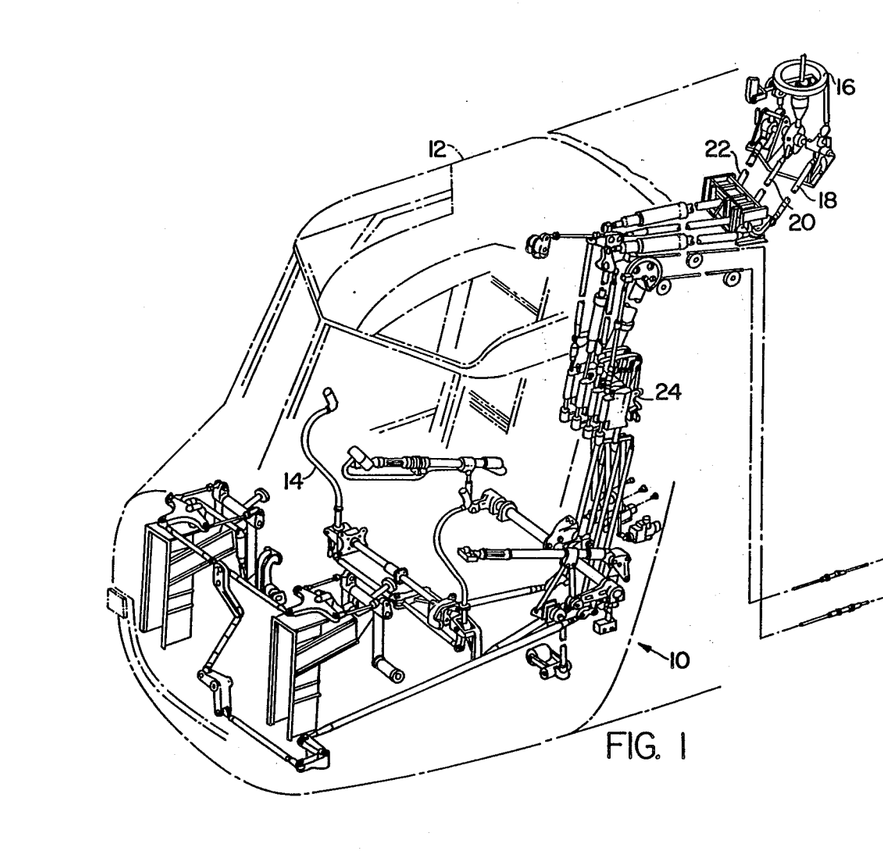
FIG. 1 is a simplified schematic illustration showing a portion of a mechanical control system found in the prior art.

FIG. 1 shows a portion of a mechanical control system 10 used in a helicopter 12, shown in phantom. The control system is an example of a known mechanical control system and is comprised of a plurality of levers, bellcranks, control rods and other such mechanical devices needed to translate control signals provided by a pilot at control stick 14 to adjust the pitch of helicopter blades (not shown) rotating above swash plate 16. As detailed hereinabove, the swash plate is a rotary coupler which will transmit mechanical displacement received on control rods 18, 20 and 22 to actuators on the rotating helicopter blades.

The helicopter control system of FIG. 1 also incorporates automatic stabilization equipment (ASE) 24 which provides in a known manner stability augmentation and higher harmonic control signals which are superimposed on the input control signal. The exact same composite control signal must then be applied simultaneously to each of the rotating helicopter blades. That is, no helicopter blade can be addressed individually.

Moreover, these input signals provide for stability augmentation are typically a small magnitude at relatively high frequencies. Because of the mechanical nature of the system and the limitations mandated by built-in setbacks note above, the true benefit of the active control input signal is compromised.

Figure 2:
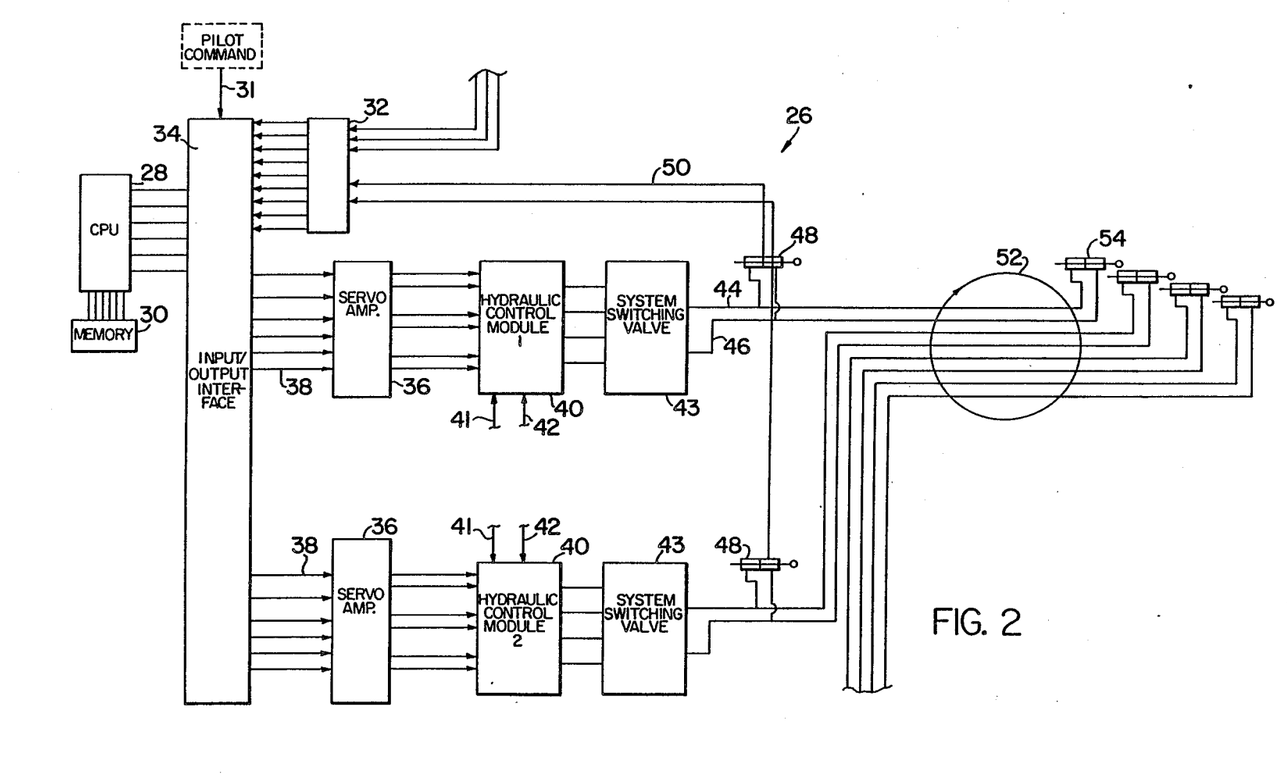
FIG. 2 is a simplified illustration of a portion of a hydraulic control system provided according to the present invention.

Referring now to FIG. 2, there is illustrated a simplified schematic diagram of a portion of a hydraulic control system 26 provided according to the present invention. The hydraulic control system 26 includes a central processing unit (CPU) 28 and memory 30 which contain flight control algorithms. External pilot command signals are presented on line 31. Helicopter parameter signals are presented on lines 32 to input/output interface 34 are then processed by the CPU. For a typical four bladed helicopter the input signals include signals indicative of the following parameters:

| | |
|---|---|
| Collective pitch | Cyclic pitch |
| Lateral pitch | ASE input $\Delta$ P transducer inputs |
| Longitudinal pitch | Main control valve (LVDT) |
| Blade trim (controls) | Main ram position (LVDT) |
| Blade tracking | Gust sensing $\Delta$ P transducer input |

The central processing unit will, in accordance with control algorithms provide output control signals to a servo amplifier 36 on lines 38. These control signals will then operate a plurality of electro hydraulic valves which comprise part of control module 40.

In the preferred embodiment, the hydraulic control module is configured with two hydraulic systems ($c_1, c_2$) each comprising a source 41 and return 42 line which are selected by system switching valve 43. The hydraulic signals are presented on either lines 44 or 46. A transducer, preferably a rotary variable differential transducer (RVDT) or LVDT for a linear actuator, is included to provide actuator simulation and outputs on line 50 a feedback signal to the central processing unit.

The hydraulic control signal is presented through a hydraulic slip ring 52, detailed hereinafter to a hydraulic actuator 54 located on the rotating helicopter blades. Although the system components for only two helicopter blades are illustrated in FIG. 2, there will be a two additional control elements generating control signals on respective line for a four bladed helicopter, as shown in FIG. 2.

Figure 3:
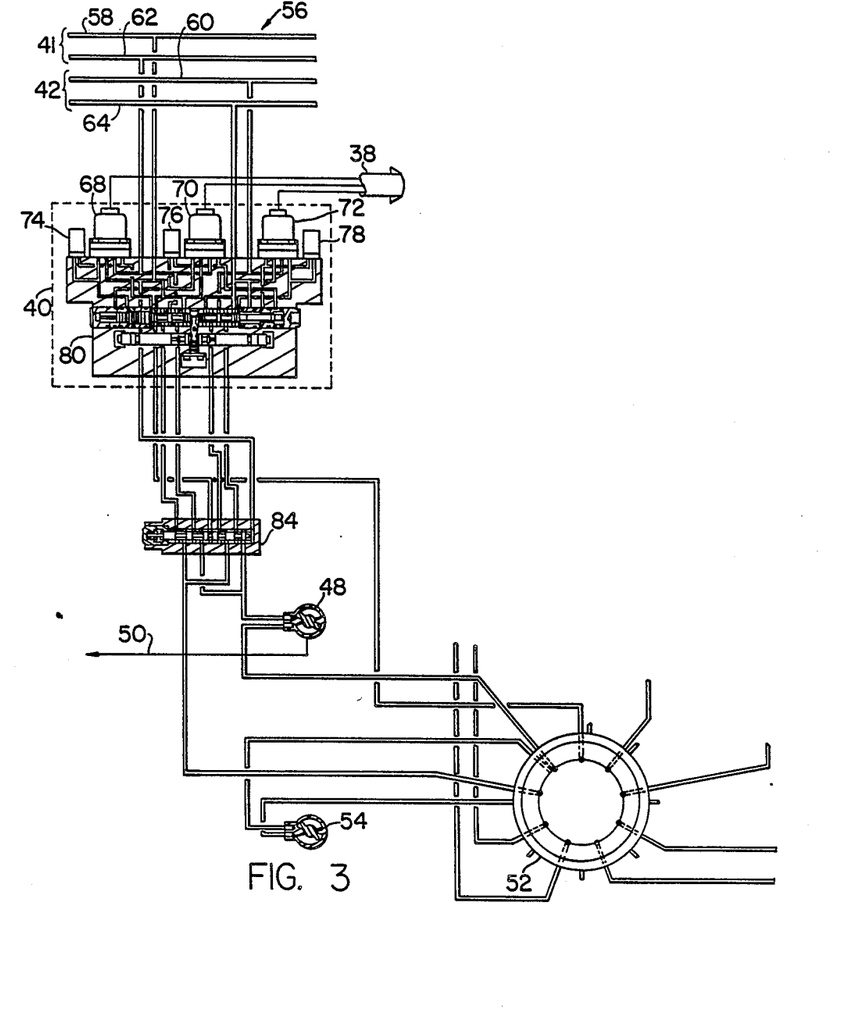
FIG. 3 is a schematic illustration of a hydraulic circuit found in the control system of FIG. 2.

Referring now to FIG. 3, there is illustrated a hydraulic circuit 56 used in the control system of FIG. 2. As indicated hereinabove, the hydraulic circuit includes primary and secondary hydraulic systems ($c_1, c_2$) each comprised of a pressure 58,60 and return 62,64 hydraulic lines.

Each helicopter blade has a control module 66 that includes a plurality of electro-hydraulic valves 68, 70 and 72 configured in a known fashion to provide two levels of redundancy. In FIG. 3, only one of four control modules is shown. Differential transducers 74, 76 and 78 are installed between each of the primary and secondary system pressure lines and monitor the operation of that channel. In case of conflict between the channels (e.g. a failure of the valve) the two channels with similar values of pressure difference will "out vote" the third channel. This function is performed by the switching solenoid valve positioned downstream of the electro-hydraulic in the control module. The solenoid triggers the bypass of the electro-hydraulic valve pressure 1 and pressure 2 lines in the defective channel. In the preferred embodiment, each of the electro-hydraulic valves in the system is capable of operating the primary and secondary hydraulic systems of the helicopter. The hydraulic circuit comprising the hydraulic control modules are connected to the primary and secondary hydraulic systems in the helicopter. Both of the systems are driven from the combining gearbox for a multi-engine helicopter or from the accessories gearbox in a case of a single engine helicopter. The primary system pressure is ported through a filter (not shown) to the electro-hydraulic valves and to the pressure port on the main control valve. The secondary system is similarly connected to an electro-hydraulic valve and the secondary control pressure port on the main control valve.

In response to a control signal received by an electro-hydraulic valve, a difference in pressure is produced between the hydraulic inputs for a particular electro-hydraulic valve. This difference in pressure ($\Delta P$) moves a spool 82 in the control module. This movement connects one of the actuator cylinder ports to the system pressure and the other port to the return through the system switching valve 43. The spool 82 has a set of centering springs which bring it to a neutral position in the absence of a pressure differential thereacross. The main control valve spool MCV transducer 48 is connected through a synchronizing link to the (LVDT) installed to monitor the MCV spool position.

The system switching valve 43 receives the primary system pressure at one end of spool 84 which comprises part of the system switch valve 43. The spool disconnects the secondary system actuator cylinder lines coming from the main control module to that of the actuator. In case of failure to the primary system the spool valve shuttles due to a spring installed in the system and disconnects the primary system cylinder lines from the control module to that of the actuator and simultaneously connects the secondary system main control valve lines to that of the actuator lines to accomplish the desired redundancy.

An embodiment which includes dual tandem control the system switching valve is deleted and all four cylinder lines are connected to the four cylinder lines of the dual tandem system.

One output from the system switching valve is received by actuator simulator port 1. The second port of the actuator simulator is connected to the input cylinder port for the respective actuator channel stator of the hydraulic slip ring. The second line from the system switching valve is directly connected to the second cylinder port in the stator of the hydraulic slip ring. This connection is repeated for the rest of the three control modules in the four bladed helicopter of FIG. 2. The actuator simulator and feedback RVDT is positioned on the fuselage to avoid installation of feedback devices in a rotating system and carrying feedback signal through an electrical slip ring which would increase sophistication and contribute to electrical noise.

In the preferred embodiment, the main control valve comprises a lap, spool and sleeve assembly installed in a split manifold isolating the two hydraulic systems. The solenoid operated bypass valves are conventional and are the type used in aircraft hydraulic systems. The electro-hydraulic valves are of a conventional type used in fly by wire control systems and in auto pilots.

The control modules are remotely located in the preferred embodiment and present a dynamic stiffness problem which is solved by wrapping the lines with preloaded fiber. This is the same principle used in the design of composite Kevlar-wrapped hydraulic accumulator bodies. In addition to the electro hydraulic redundancies, an actuator will have built-in dynamic biases for a safe autorotation in case of total electrical and hydraulic failure.

The output hydraulic signal from one of the cylinder ports in the hydraulic control module in the form of cylinder pressure and flow is presented through the control actuator simulator 48 which has identical characteristics to the main actuator. A feedback transducer (RVDT or LVDT) is configured with the simulator and provides feedback signals on lines 50 to the CPU.

Hydraulic control signals are provided along respective lines to the rotating system through the hydraulic slip ring 52. The hydraulic slip ring is configured with nine channels, and presents the hydraulic control signals to actuators represented schematically by actuator 54 which can be either of a linear or rotary type.

Figure 4:
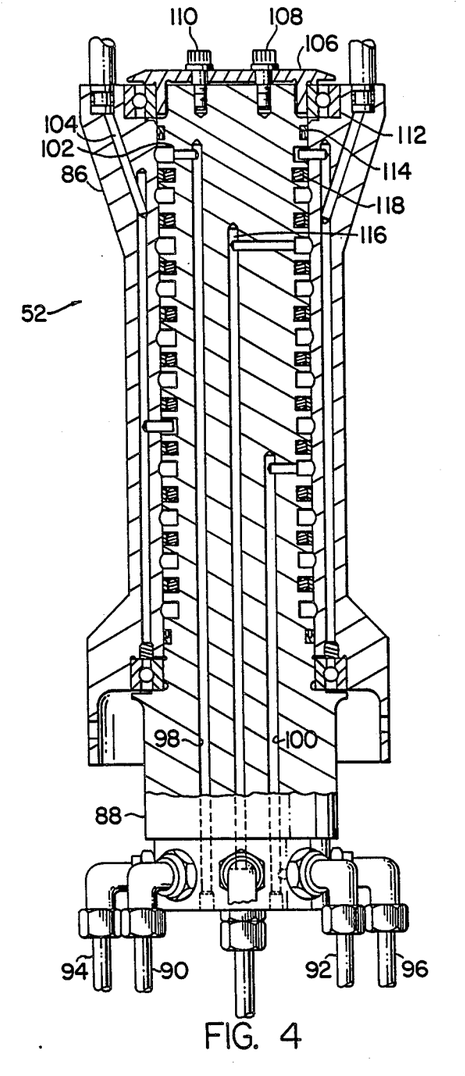
FIG. 4 is a sectioned illustration of a portion of the hydraulic slip ring of the system of FIG. 2.

Referring now to FIG. 4, there is illustrated in section a portion of the hydraulic slip ring 52 of FIG. 1. The hydraulic slip ring comprises an outer rotor 86 which is configured to be received by an inner stator 88. The stator consists of twelve concentric flow channels each set of two channels for one blade pitch, horn or hinge line actuator. Positioned next to these two channels in the slip ring is a return line groove. This configuration is repeated for each of the next three helicopter blades. The return groove between each set of blades actuator lines picks up the lap leakage and also provides system isolation. Each of the 12 grooves is sandwiched between a set of "O" ring grooves per MIL-G-5514F. The stator and rotor of the slip ring are lap fitted to provide redundant system isolation apart from the primary sealing done by either "O" rings or piston rings. In FIG. 4, hydraulic control signals are presented on lines 90,92 with pressure and return lines 94,96 also shown.

The hydraulic slip ring is preferably configured with a plurality of inner bores or channels, such as bores 98 and 100, which sources and returns hydraulic control signals presented in the manner described hereinabove. The hydraulic control signals are, for example, presented at outer groove 102. A corresponding groove 103 is configured in the rotor and provides the hydraulic control signals thereacross to channel 104 in the rotor and eventually to the corresponding helicopter blade actuator. End cap 106 is positioned with the rotor to locate the rotor via retention bolts 108 and 110.

Each of the registered flow and return grooves in both the rotor and stator are preferably formed with a scalloped configuration. Those skilled in the art will note that right angles connecting channels in the rotor or stator to the flow grooves will lead to fatigue in the rotating member. The scalloped portion reduces the material fatigue.

Also shown in FIG. 4 are a plurality of seals such as rod seal 112 and GLYD ring 114. A rod seal is conventional and performs its known function. It is preferable to configure the flow grooves and return grooves to be separated by a common system return 116, as well as by "O" rings 118. This configuration of separating the pressure line from its corresponding return line by "O" rings and an intermediate common return line collects lap leakage and further prevents communication between adjacent channels in the event of a seal component failure.

The collective input signal generated from the transducer on the pilot's collective controller stick, is scaled by the CPU to give full helicopter blade travel. The cyclic pitch signal is generated on the cyclic of stick controller by having two transducers approximately 90 degrees apart to resolve the longitudinal and lateral components of a pilots input command. Both of the outputs of the transducers are scaled to represent their respective control authority for maximum amplitude relative to the input signal magnitude.

The combined signal waveform generated by collective longitudinal and lateral signal inputs, is modified by the stability augmentation inputs, auto pilot inputs, higher harmonic inputs and miscellaneous blade trim input signals. This combined, forms the input command to the control module. Each of the second, third, and fourth blades are displaced phasewise 90, 180 and 270 degrees apart respectively.

Figure 5:
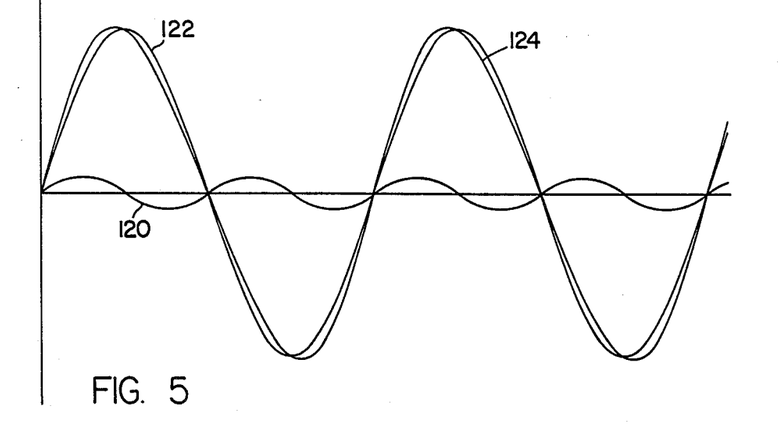
FIG. 5 illustrates diagrammatically a composite output control signal comprised of a cyclic pitch signal with a two per rev higher harmonic input signal superimposed thereon.
Figure 6:
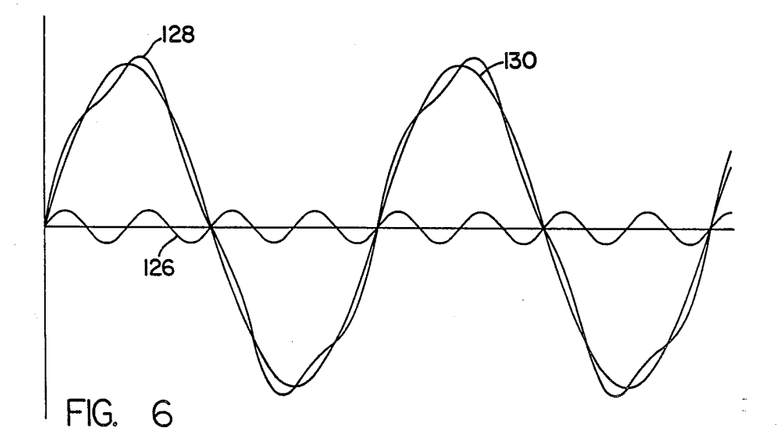
FIG. 6 illustrates a composite output control signal having a four per rev signal superimposed on a cyclic pitch control signal.

FIGS. 5 and 6 each contain diagrammatic illustrations of a control signal presented to an individual helicopter blade by the system of the present invention. Curve 120 corresponds to a cyclic pitch signal, while curve 122 corresponds to a 2 per rev higher harmonic input signal at approximately 10% of the cyclic pitch signal amplitude. The composite output signal to the actuator is shown by curve 124.

Similarly, curve 126 illustrates a 4 per rev higher harmonic input signal, while curve 128 shows the input pitch signal. Curve 130 represents the composite signal.

Similarly, although the invention has been described hereinabove with respect to a preferred embodiment thereof, it should be understood by those skilled in the art that various changes, omissions and additions thereto may be made therein without departing from the spirit and scope of the invention.

I claim:

1. An apparatus for use in providing fluid control signals from a first element to a moveable second element, comprising:
   a first member having a outer surface formed with a plurality of sets of grooves, each of said grooves receiving respective fluid control signals by means of corresponding channels formed in said first member interior;
   a second member rotatable about a second member longitudinal axis and adapted to receive, at an inner surface therof, said first member outer surface, said second member inner surface having a plurality of sets of grooves communicating with corresponding interior second member channels, each second member groove in registration with a corresponding first member groove, said registered first and second member grooves continuously commnicating said fluid control signals throughout said second member movement; and
   return grooves formed in said first and second members opposed surfaces spaced between said groove sets and communicating with associated return channels in said first and second members for providing fluid isolation between each of said groove sets.

2. The apparatus of claim 1 wherein said second member is lap fitted with respect to said first member.

3. An apparatus for use in providing fluid control signals from a first element to a moveable second element, comprising:
   a first member having an outer surface formed with a plurality of sets of grooves, each of said grooves receiving respective fluid control signals by means of corresponding channels formed in said first member interior;
   a second member displaceable along a first member longitudinal axis and adapted to receive, at an inner surface thereof, said first member outer surface, said second member inner surface having a plurality of sets of grooves communicating with corresponding interior second member channels, each second member groove in registration with a corresponding first member groove, said registered first and second member grooves continuously communicating said fluid control signals throughout said second member movement; and
   return grooves formed in said first and second members opposed surfaces spaced between said groove sets and communicating with associated return channels in said first and second members for providing fluid isolation between each of said groove sets.

4. A hydraulic actuator assembly, comprising:
   hydraulic valving means communicating with a source of hydraulic pressure and a hydraulic pressure return through respective ports in said valving means, said valving means for selectively providing hydraulic control signals;
   an interface apparatus including a first member having an outer surface formed with a plurality of sets of grooves each of said grooves receiving, from a respective internal channel, said hydraulic control signals, and a second member rotatable about a second member longitudinal axis and adapted to receive at an inner surface thereof said first member outer surface, said second member inner surface having a plurality of sets of grooves each of said grooves in registration with a corresponding first member groove and each providing said control signals to a corresponding second member channel, said registered first and second member grooves continuously communicating said hydraulic control signals throughout said second member movement;
   return grooves formed in said first and second members opposed surfaces spaced between said groove sets and communicating with associated return channels in said first and second members for providing fluid isolation between each of said groove sets; and
   an actuator means configured with said moving second member, for receiving said control signals from said interface apparatus and generating displacement in dependence thereon.

5. The assembly of claim 2 further comprising "O" ring seals positioned in grooves in said second member inner surface, each of said "O" ring grooves positioned in said second member inner surface between one of said hydraulic control signal grooves and one of said return grooves at an acute angle with respect to a plane perpendicular to said longitudinal axis.

6. A hydraulic actuator assembly, comprising:
   hydraulic valving means, communicating with a source of hydraulic pressure and a hydraulic pressure return through respective ports in said valving means, said valving means for selectively providing hydraulic control signals;
   an interface apparatus including a first member having an outer surface formed with a plurality of grooves receiving, from a respective internal channel, said hydraulic control signals, and a second member is displaceable along a first member longitudinal axis and is adapted to receive at an inner surface thereof said first member outer surface, said second member inner surface having a plurality of grooves each in registration with a corresponding first member groove and each providing said control signals to a corresponding second member channel, said registered first and second member grooves continuously communicating said hydraulic control signals throughout said second member movement; and
   an actuator means configured with said moving second member, for receiving said control signals from said interface apparatus and generating displacements in dependence thereon.

7. A hydraulic actuator assembly, comprising:
   a first hydraulic valving means, communicating with a source of hydraulic pressure and a hydraulic pressure return through respective ports in said valving means, said valving means for selectively providing hydraulic control signals;

an interface apparatus including a first member having an outer surface formed with a plurality of grooves receiving, from a respective internal channel, said hydraulic control signals, and a second member adapted to receive at an inner surface thereof said first member outer surface, said second member inner surface having a plurality of grooves each in registration with a corresponding first member groove and each providing said control signals to a corresponding second member channel, said registered first and second member grooves continuously communicating said hydraulic control signals throughout said second member movement;

an actuator means configured with said moving second member, for receiving said control signals from said interface apparatus and generating displacements in dependence thereon; and a second valving means configured in parallel with said first valving means communicating with said source of fluid pressure and said fluid pressure return groove respective ports separate from said first valving means respective ports for selectively providing said fluid control signals, said assembly further comprising a selector valve means receiving said control signals from both said first and second valving means, said selector means for providing said control signals only from a selected one of said valving means in dependence on a control signal.

8. The assembly of claim 4 further comprising a feedback means for providing signals indicative of said actuator displacement.

9. A hydraulic actuator assembly, comprising:

hydraulic valving means, communicating with a source of hydraulic pressure and a hydraulic pressure return through respective ports in said valving means, said valving means for selectively providing hydraulic control signals;

an interface apparatus including a first member having an outer surface formed with a plurality of grooves receiving, from a respective internal channel, said hydraulic control signals, and a second member adapted to receive at an inner surface thereof said first member outer surface, said second member inner surface having a plurality of grooves each in registration with a corresponding first member groove and each providing said control signals to a corresponding second member channel, said registered first and second member grooves continuously communicating said hydraulic control signals throughout said second member movement;

an actuator means configured with moving second member, for receiving said control signals from said interface apparatus and generating displacements in dependence thereon; and a plurality of seals positioned between said first and second members spaced between each of said source and return grooves.

10. The system of claim 9 further comprising a common return channel and corresponding grooves positioned between said first and second members and between each of said groove pairs.

11. A system for providing hydraulic control signals from a fixed first member to an actuator on a rotating second member, said system comprising:

a controller receiving a plurality of signals indicative or corresponding first and second member parameters and receiving command signals, said controller for generating electrical control signals in accordance with predetermined algorithms;

an electro-hydraulic actuator assembly receiving said electrical control signals for providing corresponding hydraulic control signals between said first and second members, said assembly including a hydraulic valving means, communicating with a source of hydraulic pressure and a hydraulic pressure return through respective ports in said valving means, said valving means for selectively providing hydraulic control signals;

an interface apparatus, said first member having an outer surface formed with a plurality of grooves, each receiving respective hydraulic control signals from a corresponding first member channel and the second member adapted to receive, at an inner surface thereof, said first member outer surface, said second member inner surface having a plurality of grooves each in registration with a correspond first member groove, said registered first and second member grooves continously communicating said hydraulic control signals throughout said second member movement for providing said control signals to the actuator through associated second member channels.

12. The system of claim 11 wherein said interface apparatus communicates said hydraulic control signals by means of an associated source and return pair of said channels and grooves.

13. The system of claim 12 further comprising common return channels and corresponding grooves positioned between said associated first and second member groove pairs.

* * * * *